(12) United States Patent
Lehtovirta et al.

(10) Patent No.: US 9,420,456 B2
(45) Date of Patent: Aug. 16, 2016

(54) CENTRALIZED KEY MANAGEMENT IN EMBMS

(71) Applicant: TELEFONAKTIEBOLAGET L M ERICSSON (PUBL), Stockholm (SE)

(72) Inventors: Vesa Lehtovirta, Espoo (FI); Eric Joseph Turcotte, Montreal (CA); Michael John Sissingar, Skärholmen (SE); Karl Norrman, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 217 days.

(21) Appl. No.: 13/886,630

(22) Filed: May 3, 2013

(65) Prior Publication Data

US 2013/0294603 A1 Nov. 7, 2013

Related U.S. Application Data

(60) Provisional application No. 61/642,169, filed on May 3, 2012.

(51) Int. Cl.
*H04W 12/04* (2009.01)
*H04L 29/06* (2006.01)

(52) U.S. Cl.
CPC .............. *H04W 12/04* (2013.01); *H04L 63/064* (2013.01)

(58) Field of Classification Search
CPC .................................................. H04W 12/04
USPC ......................................................... 380/270
See application file for complete search history.

(56) References Cited

U.S. PATENT DOCUMENTS

| | | | | |
|---|---|---|---|---|
| 6,286,032 B1 * | 9/2001 | Oberlander et al. | ........... | 709/203 |
| 6,539,092 B1 * | 3/2003 | Kocher | .................... | 380/252 |
| 6,876,747 B1 * | 4/2005 | Faccin | ................... | H04L 63/06 380/247 |
| 7,149,308 B1 * | 12/2006 | Fruehauf et al. | ................ | 380/44 |
| 7,903,821 B2 * | 3/2011 | Zhu | ....................... | H04L 9/0822 370/328 |
| 8,166,180 B2 * | 4/2012 | Jalkanen | ............. | H04L 41/5022 709/227 |
| 8,325,922 B1 * | 12/2012 | Sun | ...................... | H04W 12/04 380/258 |
| 8,457,318 B2 * | 6/2013 | Gunther | ............... | H04L 63/062 370/331 |
| 8,824,680 B2 * | 9/2014 | King | ...................... | H04L 9/083 380/270 |
| 2001/0019310 A1 * | 9/2001 | Luby | .............................. | 341/50 |
| 2004/0073928 A1 * | 4/2004 | Alakoski | ............ | H04L 12/1886 725/62 |
| 2004/0101274 A1 * | 5/2004 | Foisy et al. | ..................... | 386/46 |
| 2005/0008159 A1 * | 1/2005 | Grilli et al. | ..................... | 380/270 |

(Continued)

FOREIGN PATENT DOCUMENTS

| | | | | | |
|---|---|---|---|---|---|
| WO | WO 2006054860 A1 * | 5/2006 | ............ | H04L 9/0822 |
| WO | WO 2010114475 A2 * | 10/2010 | ............ | H04L 12/189 |
| WO | WO2011/032400 A1 | 3/2011 | | |

OTHER PUBLICATIONS

Wallner et al., "Key Management for Multicast: Issues and Architectures", RFC 2627, 1999.*

(Continued)

*Primary Examiner* — O. C. Vostal
(74) *Attorney, Agent, or Firm* — Ericsson Inc.

(57) ABSTRACT

A split architecture eMBMS with distributed BMSCs providing the same eMBMS service allows for a centralized key service where each BMSC is able to derive a set of MTKs from the MSK using the MTK-IDs as the differentiating input. This avoids the need to send MTKs to the BMSCs.

21 Claims, 4 Drawing Sheets

(56) References Cited

U.S. PATENT DOCUMENTS

| | | | |
|---|---|---|---|
| 2005/0157876 A1* | 7/2005 | Jeong | H04L 63/0428 380/200 |
| 2006/0291660 A1* | 12/2006 | Gehrmann | H04L 63/045 380/277 |
| 2007/0005958 A1* | 1/2007 | Hsu | H04L 63/0428 713/163 |
| 2007/0036167 A1* | 2/2007 | Hu | H04L 12/14 370/410 |
| 2007/0101122 A1* | 5/2007 | Guo | H04L 63/061 713/153 |
| 2007/0174472 A1* | 7/2007 | Kulakowski | 709/229 |
| 2007/0223703 A1* | 9/2007 | Verma | H04L 9/0822 380/278 |
| 2008/0037468 A1* | 2/2008 | Zisimopoulos | H04W 76/002 370/331 |
| 2008/0114978 A1* | 5/2008 | Lehtovirta | H04L 63/061 713/155 |
| 2008/0160959 A1* | 7/2008 | Huang | H04L 63/0869 455/411 |
| 2008/0287057 A1* | 11/2008 | Zisimopoulos | H04W 72/005 455/3.01 |
| 2008/0294560 A1* | 11/2008 | Holtmanns | H04L 63/06 705/51 |
| 2009/0143105 A1* | 6/2009 | Cho | H04L 12/5895 455/559 |
| 2009/0197523 A1* | 8/2009 | Seok | H04H 20/38 455/3.01 |
| 2009/0209232 A1* | 8/2009 | Cha | H04L 63/0428 455/411 |
| 2009/0282246 A1* | 11/2009 | Gunther | H04L 63/062 713/168 |
| 2010/0049980 A1* | 2/2010 | Barriga | H04L 12/66 713/171 |
| 2010/0262714 A1* | 10/2010 | Hiie | 709/234 |
| 2010/0303242 A1* | 12/2010 | Holtmanns | H04L 63/06 380/278 |
| 2011/0055565 A1* | 3/2011 | Murakami | H04L 63/061 713/168 |
| 2011/0064219 A1* | 3/2011 | Edlund | H04L 63/06 380/211 |
| 2012/0057697 A1* | 3/2012 | Holtmanns | H04L 9/0838 380/42 |
| 2012/0102315 A1* | 4/2012 | Holtmanns | H04L 63/06 713/150 |
| 2012/0148050 A1* | 6/2012 | Lewis | H04L 63/06 380/278 |
| 2012/0176953 A1* | 7/2012 | Chao | H04L 65/1069 370/312 |
| 2013/0054964 A1* | 2/2013 | Messerges | H04L 9/0833 713/163 |
| 2014/0082360 A1* | 3/2014 | Laitinen | H04W 12/04 713/168 |

OTHER PUBLICATIONS

Baugher et al., "Multicast Security (MSEC) Group Key Management Acrictecture ", RFC 4046, 2005.*
3GPP, "3rd Generation Partnership Project; Technical Specification Group Services and System Aspects; Generic Authentication Architecture (GAA); Generic bootstrapping architecture (Release 6)", 2007.*
Weng et al., "Dynamic Rekeying in 3GPP Multimedia Broadcast/Multicast Service (MBMS)", 2000.*
Tantawy et al., "Performance and Rekeying Analysis of Multicast Security in LTE", 2013.*
3GPP, "3GPP TS 33.220 V1.1.0 (Feb. 2004) (Release 6)", 2004.*
3GPP, "3GPP TS 23.246 V10.1.0 (Jun. 2011) (Release 10)", 2011.*
3GPP, "3GPP TS 23.246 V9.2.0 (Sep. 2009) (Release 9)", 2009.*
Weng et al., "Comparative study of broadcast and multicast in 3GPP and 3GPP2 networks", 2008.*
LTE, "ETSI TS 126 346 V9.1.0 (Jan. 2010) (3GPP TS 26.246 version 9.1.0 Release 9)", few pages, 2010.*
Niemi et al., "3GPP SA3 status", 2009.*
3GPP2, "Broadcast-Multicast Service Security Framework", 3GPP2 S.S0083S-A, 2004.*
Arkko et al., "MIKEY: Multimedia Internet KEYing", 2004.*
Ou et al., "The UMTS-AKA Protocols for Intelligent Transportation Systems", 2009.*
Weng et al., "Comparative study of broadcast and multicast in 3GPP and 3Gpp2 networks", 2007.*
Lecompte et al., "Evolved Multimedia Broadcast/Multicast Service (eMBMS) in LTE-Advanced: Overview and Rel-11 Enhancements", 2012.*
Lohmar et al., "Radio Resource Optimization for MBMS File Transmissions", 2009.*
Cheng et al., "Key Management for UMTS MBMS", 2008.*
Hartung et al., "Delivery of Broadcast Services in 3G Networks", 2007.*
Xu et al., "Key Management for 3G MBMS Security", 2004.*
Carrara et al., "The Key ID Information Type for the General Extension Payload in Multimedia Internet KEYing (MIKEY)", RFC 4563, 2006.*
Arkko et al., "MIKEY: Multimedia Internet KEYing", RFC 3830, 2004.*
Baugher et al., "The Secure Real-Time Transport Protocol (SRTP)", RFC 3711, 2004.*
Hooshyar, "Feasibility analysis of MBMS deployment with the introduction of LTE", 2013.*
Xylomenos et al., "The multimedia broadcast/multicast service", 2006.*
Hartung et al., "MBMS—IP Multicast/Broadcast in 3G Networks", 2009.*
Ericsson et al.: "Support for multiple BM-SCs"; 3GPP TSG-SA WG3 Meeting #69: Edinburgh, Scotland, UK, Nov. 5-9, 2012, 13 pages.
3GPP TS 33.246 V10,0.0; 3rd Generation Partnership Project; Technical Specification Group Services and System Aspects; 3G Security; Security of Multimedia Broadcast/Multicast Service (MBMS) (Release 10); Dec. 2010; 68 pages.
International Search Report for PCT/IB2013/053548; maling date of Sep. 19, 2013; 5 pages.

* cited by examiner

CENTRALIZED KEY MANAGEMENT IN EMBMS

CROSS REFERENCE TO RELATED APPLICATIONS

This application claims the benefit of priority to U.S. Provisional Patent Application No. 61/642,169, filed May 3, 2012, the contents of which are expressly incorporated herein by reference.

TECHNICAL FIELD

The present disclosure relates generally to the management of key pairs in an evolved Multimedia Broadcast Multicast Service (eMBMS).

BACKGROUND

The use of mobile data networks to access multimedia content, such as live video, is a service used only by a small number of users. However, the number of users is increasing, and even with the small number of users, the amount of data that they consume is disproportionately large. Live events such as royal weddings, tennis matches, and other such one-off events, often generate spikes in traffic that can overwhelm a network. The use of eMBMS can greatly reduce the overall traffic load. As a result, eMBMS has been designated as the multicast standard for multimedia distribution on Long Term Evolution (LTE) networks.

However, challenges have arisen where the content delivered through eMBMS is to be managed in a manner that allows content distribution control through the use of MBMS Service Keys (MSK) and MBMS Traffic Keys (MTK). One question that has arisen is how to make use of a centralized MSK/MTK key management function in a split eMBMS architecture, where the same eMBMS service can be broadcast via multiple BMSCs. Without a centralized key management system, a user will experience mobility issues that will impair the viewing experience. With centralized MSK/MTK key management, all Broadcast Multicast Service Centers (BMSC) will have the ability to use the same MSK/MTK keys for an eMBMS service, obviating the above issue. The need for centralized MSK/MTK key management does not change even if the BMSCs would be under the same or different standalone servers. The use of the same MSK/MTK keys may be over a nationwide eMBMS service (e.g. one File Delivery over Unidirectional Transport (FLUTE) channel).

Such a solution needs to work for initial registration to an eMBMS service, inter-MBSC mobility, inter-standalone server mobility, and will preferably avoid problems related to a user equipment (UE) bouncing back and forth between segments when the UE is at a segment boundary. At present, such a unified solution has not been presented. One skilled in the art will appreciate that a central key authority generating a single set of MSK/MTK keys and transmitting them to each BMSC results in an increased overhead and an degradation in the security of the system, as the transmission of each key individually results in a large quantity of overhead. The interception and decoding of the keys would compromise the system as well. Although sending a plurality of keys together can mitigate the overhead issues, the issues surrounding security become more imperative. Both of these issues also introduce new problems when scaling is taken into account, as sending keys to a large number of different BMSCs will result in a greater load on the centralized authority.

Therefore, it would be desirable to provide a system and method that obviate or mitigate the above described problems.

SUMMARY

It is an object of the present invention to obviate or mitigate at least one disadvantage of the prior art.

In a first aspect of the present invention, there is provided a method of generating an MTK, at a BMSC. The method comprises the steps of receiving a MBMS Service Key, MSK, corresponding to an MSK generated at a centralized key management service; and generating, the MTK for use in encrypting content transmitted towards a user equipment node, UE, in accordance with the received MSK.

In a first aspect of the present invention, the step of receiving includes receiving the MSK from the centralized key management service over a network interface. In a further embodiment, the step of receiving includes receiving the MSK from a standalone server transmitting the MSK on behalf of the centralized key management service.

In a further embodiment, MTK is generated as a function of the received MSK and a MTK seed value, and optionally the function is a standardized key generation function such as the standardized key generation function is a key generation function defined in the Third Generation Partnership Project Technical Specification 33.220. In a further embodiment, the MTK is also generated as a function of at least one parameter selected from a list including a service ID, a Key Domain ID, a MSK ID associated with the received MSK, an MRK and a CK||IK, where optionally the at least one parameters is transformed before being input to the KDF. In a further embodiment, MTK ID is a sequence number. In further embodiments the MTK seed value is generated as a function of an MTK generation key, and an MTK ID, and optionally the MTK generation key is known to the BMSC but not known to the UE, and further optionally it is provided by the centralized key management service which may provide it as a static value. In a further embodiment, the MTK generation key is provided by the centralized key management service on a periodic basis.

In a second aspect of the present invention, there is provided a method, for execution at a centralized key management server, of distributing keys for securing content. The method comprises the steps of generating a MBMS Service Key, MSK; transmitting the generated MSK to a Broadcast Multicast Service Center, BMSC, without transmitting a corresponding Multimedia Broadcast Multicast Traffic Key, MTK, the MSK for use in encrypting content for transmission to a user equipment node, UE; and transmitting, towards the UE, a decryption key generated at the BMSC in accordance with the transmitted MSK, to allow the UE to decrypt the content stream transmitted by the BMSC.

In an embodiment of the second aspect of the present invention, the decryption key is the MTK not transmitted to the BMSC. In a further embodiment, the step of transmitting the generated MSK includes transmitting the generated MSK to a standalone server for distribution to the BMSC. In another embodiment, the method further includes the step of transmitting a key generation function towards the BMSC, the key generation function for use by the BMSC in generating an MTK in accordance with the MSK, the generated MTK and MSK for use in encrypting the content stream. In a further embodiment, the method includes the step of transmitting at least one of service ID, a Key Domain ID, a MSK ID associated with the received MSK, an MRK and a CK||IK to the BMSC.

In a third aspect of the present invention, there is provided a Broadcast Multicast Service Center node. The node comprises a network interface, a memory and a processor. The network interface allows for communicating with a user equipment node and a centralized key management server. The memory stores instructions. The processor executes instructions stored by the memory and upon doing so causes the Broadcast Multicast Service Center node to: generate a Multimedia Broadcast Multicast Service, MBMS, Traffic Key, MTK, for use in encrypting content transmitted towards the user equipment node in accordance with a MBMS Service Key, MSK, that corresponds to an MSK generated at the centralized key management server.

In a fourth aspect of the present invention, there is provided a centralized key management server. The server comprises a network interface a memory and a processor. The network interface allows for communicating with a user equipment node and a Broadcast Multicast Service Center node. The memory stores instructions. The processor executes the stored instructions, and upon executing the stored instructions causes the centralized key management server to: generate a Multimedia Broadcast Multicast Service, MBMS, Service Key, MSK; transmit the generated MSK to a Broadcast Multicast Service Center, BMSC, without transmitting a corresponding MBMS Traffic Key, MTK, the MSK for use in encrypting content for transmission to a user equipment node, UE; and transmitting, towards the UE, a decryption key generated at the BMSC in accordance with the transmitted MSK, to allow the UE to decrypt the content stream transmitted by the BMSC.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Embodiments of present invention are directed to a system and method for providing centralized key management in a split architecture eMBMS.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

One skilled in the art will appreciate that the content of a nationwide eMBMS service is often distributed from a centralized place, such as a BVPS (Broadcast Video Provisioning Server), to BMSCs. A BMSC then will distribute the content (typically through a broadcast) over its local broadcast channels. The BVPS can also define a nationwide USD (User Service Description) which is distributed on shared data channel (SDCH).

Figure 1:
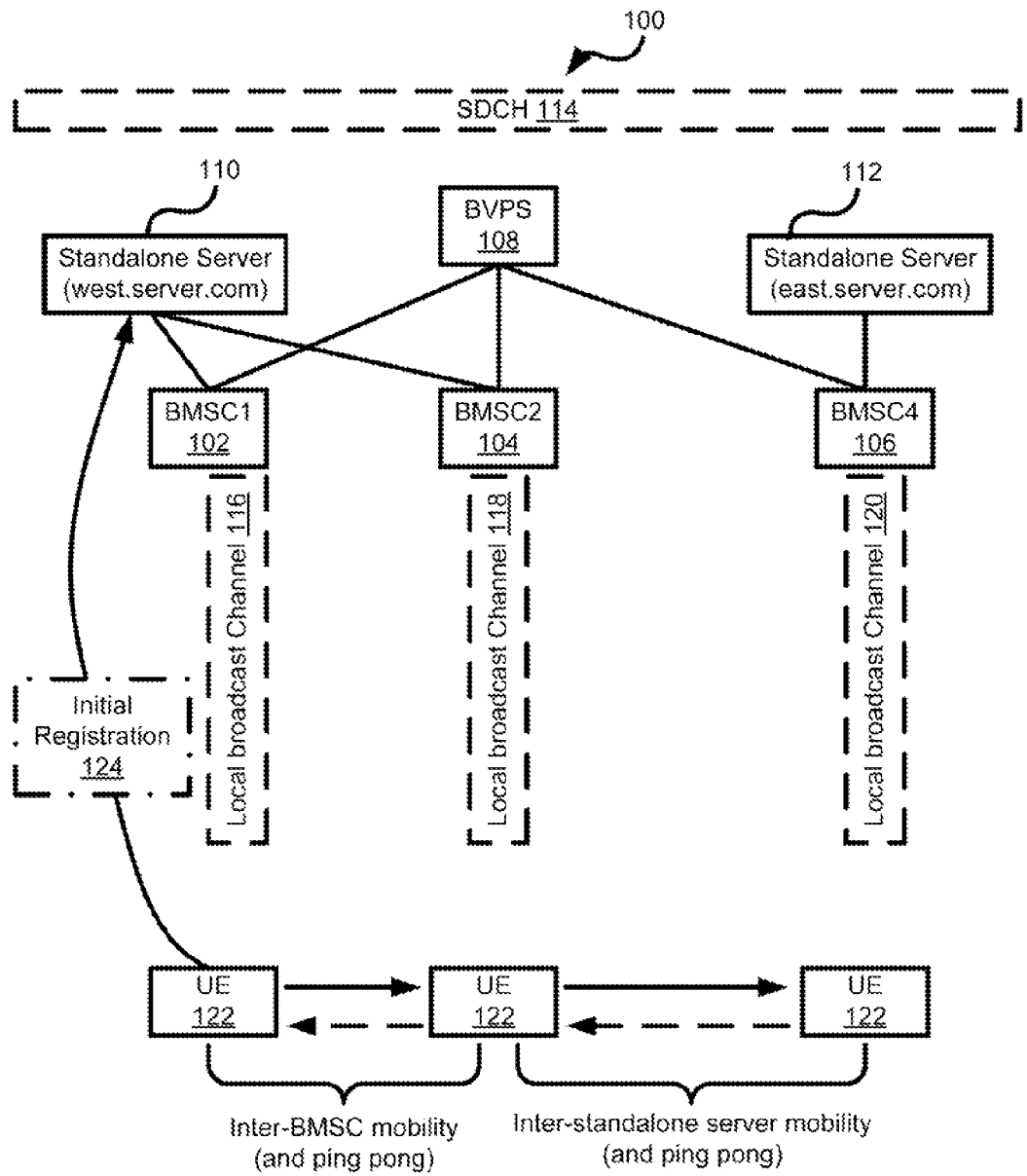
FIG. 1 illustrates an exemplary split architecture.

As illustrated in FIG. 1, a BMSC in a Split BMSC architecture typically has responsibility for: managing of the BVPS interface, the creation of the security service at the standalone server for each delivery session, generating MTK and MTK ID; the delivery of MTK (which may be done using MIKEY in FLUTE session), encrypt MTK with MSK. In the split architecture 100 of FIG. 1, a large geographic region is illustratively segmented into geographic regions served by a plurality of BMSCs (BMSC1 102, BMSC2 104 and BMSC4 106), communicating with a single BVPS 108 and standalone servers serving a western region (west.server.com 110) and an eastern region (east.server.com 112). Each Standalone server typically 110 112 has responsibility for: NAF (in which it derives MRK and MUK from Ks_xx_NAF), creating MSKs, MSK IDs, Processing registration and key requests as well as delivering MSK encrypted with MUK to the UE, maintaining a mapping of MSK IDs to user IMPI and IP based on Registration procedure, and supporting the subscriber authorization database (services=serviceID and MSK IDs; subscribers=IMPI/TMPI). Exchanges between the one of the BMSCs 102 104 and 106 and a standalone server allow for the BMSC to create the security service for delivery session, and allow the standalone server to securely convey MSK, MSK ID to the BMSC.

As illustrated in FIG. 1, a single BVPS 108 can be connected to each of the plurality of BMSCs. Each of the BMSCs are associated with a single standalone server, while a single standalone server can serve a plurality of different BMSCs. When a network wide channel SDCH 114 is offered, a UE 122 typically connects to the standalone server responsible for his region. For the initial connection, a registration process 124 with the standalone server 110 is undertaken by UE 122. Upon registration, UE 122 tunes itself to the local broadcast channel provided by BMSC 102 and receives content and metadata on that local broadcast channel 116. As UE 122 moves, it can transition to local broadcast channel 118 provided by BMSC2 104. This transition will involve an Inter-BMSC mobility function. As the UE continues to move, it can transition to local broadcast channel 120 served by BMSC4 and being under the service of standalone server 112. This transition involves an inter-standalone server mobility function and not simply the inter BMSC mobility function of the previous transition. In doing such a move, the UE 122 should be able to continue receiving the same content in a somewhat transparent fashion. To facilitate this, a centralization of key management is required. As noted above, if the UE 122 moves to a new BMSC that is not using the same MSK/MTK keys, it would be required to re-register which would cause an interruption of service that would negatively impact the user experience.

Centralization of MSK and MTK functionality in a split architecture can involve a number of different problems. One such problem is the question of how to ensure that each BMSC broadcasting the same eMBMS service uses the same set of MSK and MTK keys regardless of the BMSCs are under the same Standalone server. With respect to MSK centralization, in an eMBMS system, each of the BMSCs use the same MSK, which is received from the Standalone server. The Standalone server can receive the MSK from a central key server, e.g. BVPS. The standalone server, upon receipt of the MSK from the BVPS can send the MSK to the BMSCs. In such a scenario, MSK centralization seems to be feasible especially if the MSK does not need to be updated very often. As the MSK does not typically need to be changed on a frequent basis, MSK distribution will not typically result in an excessive load on the network or its nodes. It should be noted that in the context of the current discussion the BMSCs can receive the MSK from any of the mentioned nodes, i.e. BVPS, central key server, standalone server or some other node coordinating the keys.

To address scaling issues surrounding the centralization of MTK management the MTK ID and MTK can be generated locally by BMSCs. This provides a great deal of local flexibility, but may pose a problem in that two BMSCs cannot necessarily be guaranteed to generate the same MTK. This is because, typically, two BMSCs will not have distinct pseudo random functions (PRF) which would be guaranteed to generate the same output.

In a second scenario, the Central key server 128 can distribute the MTKs 130 to BMSCs. This may cause issues for certain streaming services or services that rely upon changing the MTK 130 frequently (e.g. after X seconds) during a program for any reason including to prevent piracy. Furthermore, this may result in excessive key distribution traffic between BMSCs and central key server 128. MTKs (with related MTK-IDs) could be sent in batches beforehand to the BMSCs, but the total amount of data to be sent would remain largely the same although the overhead associated with sending the batched MTKs could be less than sending each MTK in its own message. Additionally, the MTKs would need to be protected in transit.

In a third scenario, each BMSC can generate the MTKs itself using a pre-defined key derivation function (KDF), and a set of centrally distributed random values (e.g. one random value per MTK). As only random values (with related MTK-IDs) are sent (in place of sending complete MTKs) this decreases traffic load between a central key server and each BMSC. However, based on the number of BMSCs and other factors, the traffic load could still be quite high. Random values (with the MTK-IDs) could be sent in batches to the BMSCs to increase efficiency as discussed above. The random values may need to be protected in transit (but not necessarily with the same care as in the previous embodiment if all BMSCs know some common long term secret value which is also used as input in MTK generation).

In a fourth scenario, which is the proposed solution in the current invention, each BMSC generates the MTKs itself using, among other parameters, the MSK and MTK-ID (which can be a sequence number) as input. This allows the BMSCs to generate the same MTKs in the same order without the problems described in the MTC key distribution scenarios described above. In such an embodiment, the MTK generation could be of the form that the MTK=KDF(MSK, MTK-seed, "MTK generation"). The KDF (Key Derivation Function) can be any standard function such as the KDF defined in 3GPP TS 33.220. The MSK can be the MBMS service key, and the algorithm could rely upon the secret being in the KDF for security. Other parameters may be input to the KDF (E.g. ServiceId, Key domain ID, MSK-ID, MUK, MRK, CK||IK, or other input). The parameters may be put in a different order. The selection of additional parameters and the variation in their order can result in a more secure generation function. The parameters may be transformed before being input to the KDF, for example, the MSK could be transformed by first being run through another (or the same) key derivation function and the result being input to the KDF, or other character sting could be put as input.

In such an embodiment, the MTK-seed could take the form of: MTK-seed=KDF(MTK_generation_KEY, MTK-ID), where MTK_generation_KEY is a key known by the BMSCs but not by the UEs. The MTK-ID can be the ID of the resulting MTK. MTK-ID is typically a sequence number in MBMS, but can be also another kind of identifier, and the MTK_generation_key can be a defined character string. As discussed above, other parameters may be input to the KDF in a variety of orders and they may additionally be transformed prior to being used in the KDF. Such a system is illustrated in FIG. 2.

Figure 2:
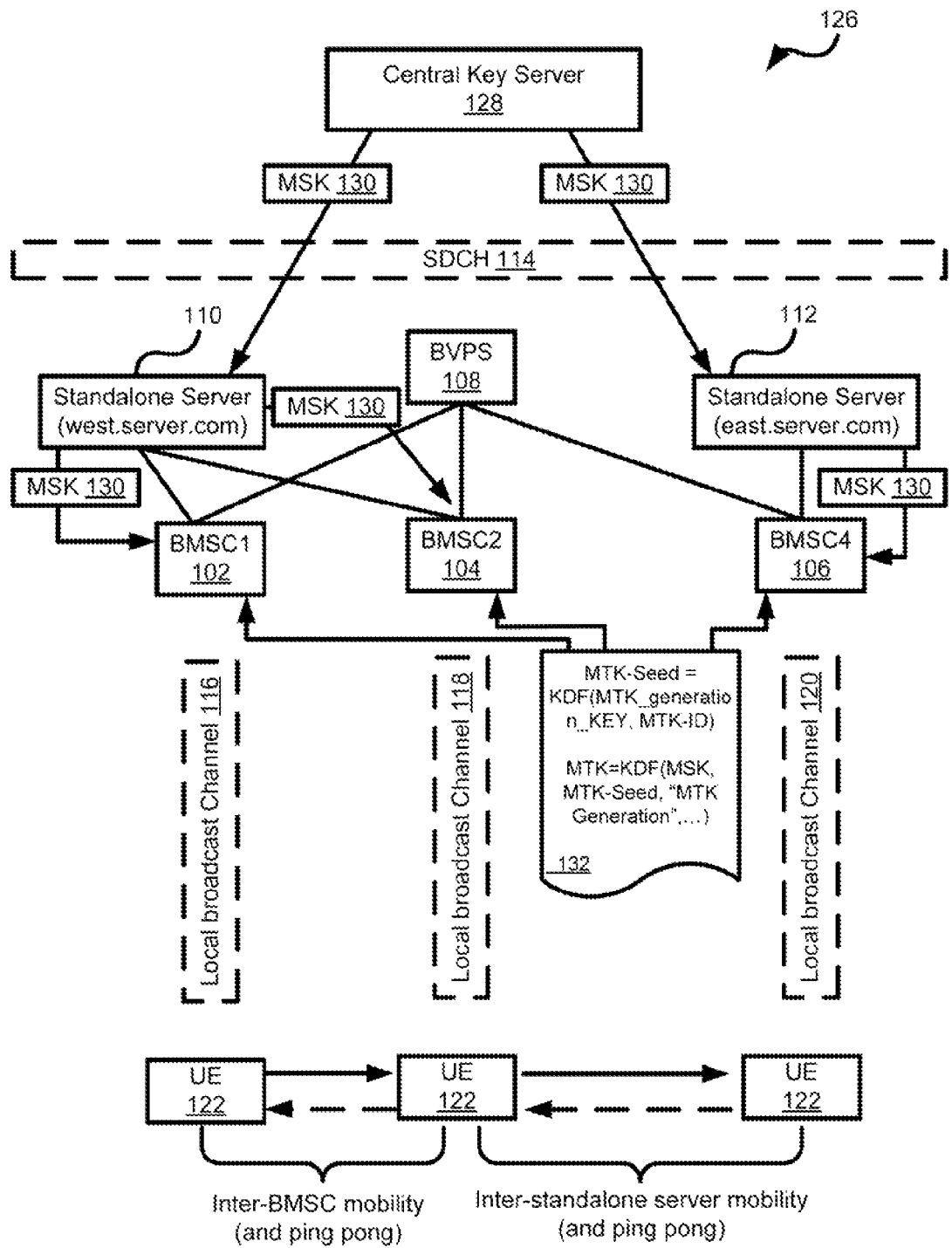
FIG. 2 illustrates an exemplary model of key centralization with MTK derived from MSK.

In the exemplary architecture 126 of FIG. 2, mobility is enhanced through the use of a central key server 128. With respect to MSK centralization, for the exemplary eMBMS service of FIG. 2, each of the BMSCs under a Standalone Server typically uses the same MSK, which is received from the Standalone server or some other node coordinating the keys. Thus, BMSC1 102 and BMSC2 104 each receive MSK 130 from standalone server 110. Standalone server 110 has received MSK 130 from central key server 128. This central key server function may be included in BVPS 108 or some other node. MSK centralization is feasible as it does not need to be updated very often and as described above, MSK distribution typically will not result in traffic load issues. It should be noted that, central key server 128 can also provide MSK 130 to standalone server 112, which can in turn provide it to BMSC4 106.

Those skilled in the art will appreciate that this embodiment takes advantage of a number of architectural advantages including that the MSK is typically already available in each BMSC and can be assumed to be well protected because it is effectively a random value. In the illustrated embodiment, a new key, referred to as MTK_generation_KEY, can optionally be employed in this embodiment. This key can be provided to the BMSCs. MTK_generation_KEY can, in some embodiments, be permanent (or relatively permanent) in nature. By not needing to change the MTK_generation_KEY, its transmission can be done during system initialization (or at other events) and the overall traffic load can be reduced. Alternatively, the MTK_generation_KEY can be updated periodically (with different implementations updating at different frequencies). Furthermore, in the MBMS key hierarchy (such as that defined by 3GPP TS 33.246) a number of MTKs are protected with an MSK. The manner in which an MSK and MTK are generated are not defined in such standards. If an MTK is derived from the MSK, it does not, in general, change the security of MBMS as the security of the system, or an eMBMS service, relies in the secrecy of the MSK, and by using a strong KDF to derive MTK from MSK, key separation will be guaranteed and it will not be possible backwards derive the MSK from MTK. The introduction of the MTK_generation_KEY to the KDF may prevent a malicious party who has obtained the MSK, from generating future MTK keys. If both the MSK and the MTK_generation_KEY are compromised, the malicious party will only be able to generate keys for a fixed time interval until one of the values is updated. The use of the MTK-ID (i.e. sequence number) in the KDF may result in different MTKs being generated, and thus result in different BMSCs being able to generate the same set of MTKs with the same MTK-IDs, without any other external coordination than having a common MSK. It should be noted that neither the UE nor UICC is impacted by the above described embodiment.

MSK and MTK centralization as described above can mitigate both inter-BMSC mobility, and inter-Standalone server mobility, as well as ping-pong problems when the UE moves back and forth from a first BMSC to a second BMSC (and possibly back again) at a boundary. With centralized key management in use, the UE can perform an initial registration to any Stand-alone server, receive the correct MSK/MTK keys since each BMSC will effectively be using the same MSK/MTK keys.

Figure 3:
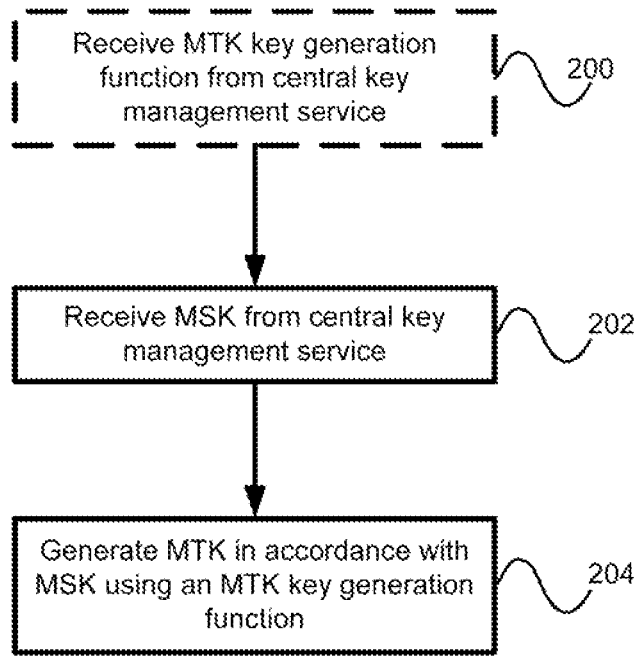
FIG. 3 is a flow chart illustrating a method for execution at a BMSC.

FIG. 3 illustrates an exemplary method for execution at the BMSC. In step 200, the BMSC receives an MTK generation function. The MTK generation function, as described above is set by the central key management service and can be either static (in which case it may be programmed during initial setup of the BMSC), or it can be dynamic and sent on a period basis. In step 202, the BMSC receives a generated MSK. This MSK is used in step 204 in generation of the MTK. Those skilled in the art will appreciate that although that key generation function and MSK originate at the central key management service, they may be received by an intermediate node such as the standalone server. The key generation function may make use of the MSK and an MTK seed value in generating the MTK, and optionally may use any one of a service ID, a Key Domain ID, a MSK ID associated with the received MSK, an MRK and a CK∥IK. Those skilled in the art will also appreciate that the MTK seed value may itself be generated at the BMSC based on values received from the centralized key management service.

Figure 4:
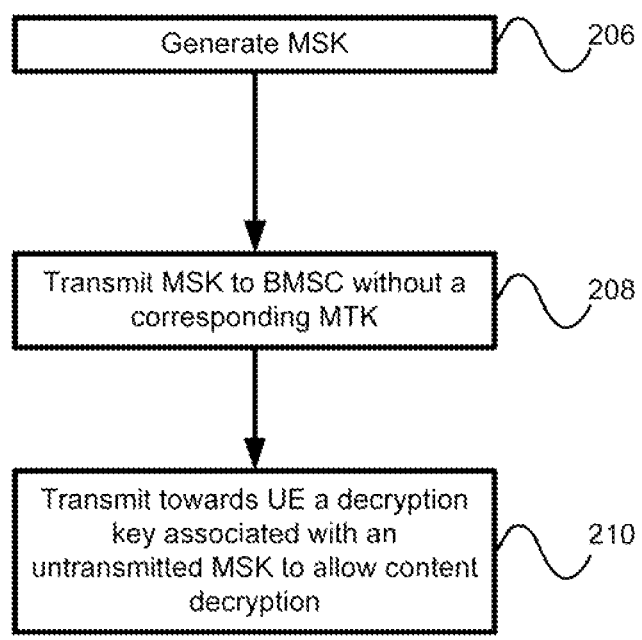
FIG. 4 is a flow chart illustrating a method for execution at a centralized key management server.

FIG. 4 illustrates an exemplary method for execution at the centralized key management server. In step 206 an MSK is generated. The MSK is transmitted to the BMSC in step 208, but no corresponding MTK is sent. In step 210 a decryption key is transmitted to a UE to allow the UE to decrypt content encrypted using the MTK generated by the BMSC (using a process such as that described in FIG. 3). One skilled in the art will appreciate that in a symmetrical encryption system, the decryption key is the MTK. The centralized key management server may transmit the MSK towards their destination (e.g. the BMSC) by transmitting them to an intermediate node that then relays them along to the intended recipient (possibly waiting for the recipient to request the key). Additionally, the server may transmit a key generation function to the BMSC to allow the BMSC to generate the MTK based on the received MSK.

Figure 5:
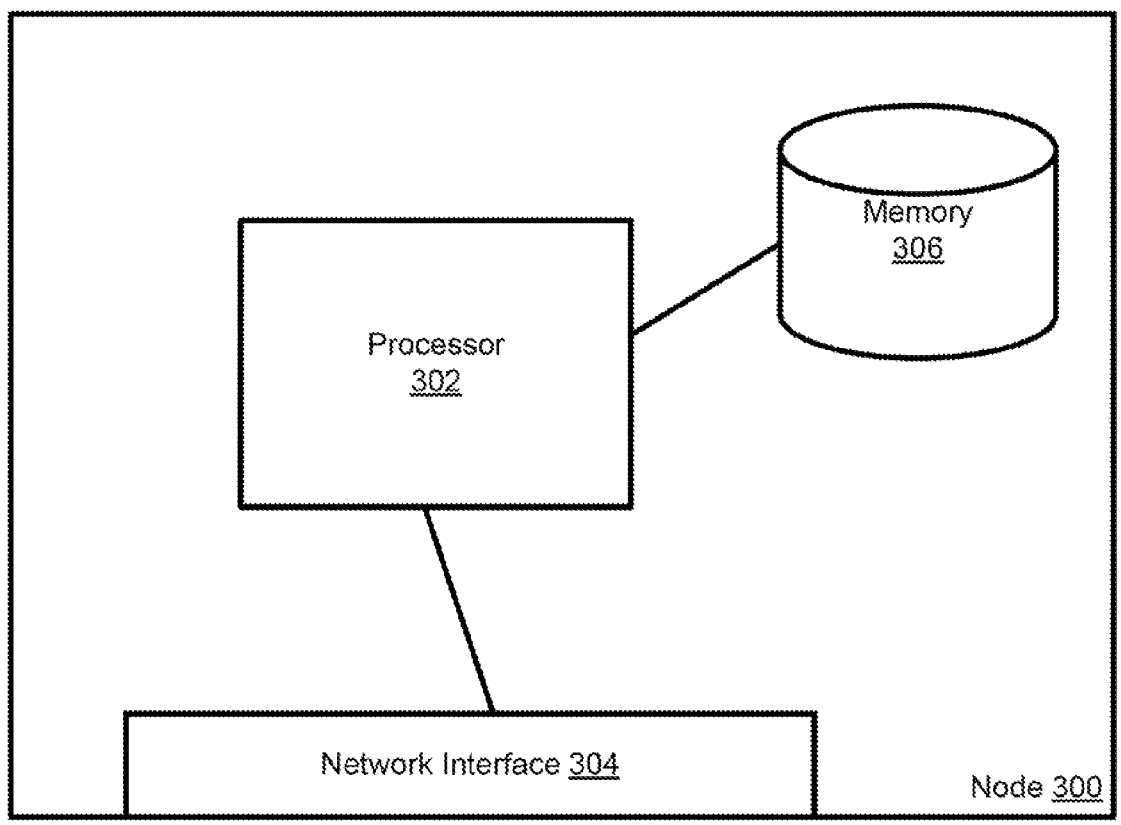
FIG. 5 is an block diagram illustrative of a node for carrying out the methods of the flow charts of FIGS. 3 and 4.

FIG. 5 illustrates an exemplary node 300 having a processor 302 a network interface 304 and a memory 306. The memory 306 can be used to store instructions that when executed by processor 302 allow the node 300 to carry out the methods of either FIG. 3 or FIG. 4 (depending on the stored instructions). The node 300 communicates with other nodes through network interface 304 in a manner that will be well understood by those skilled in the art. Additionally, it will be understood that embodiments of node 300 can be used as central key server 128 or one of the BMSC nodes in the above description, and that the memory 306 can store the instructions needed to carry out the various exemplary embodiments described above.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of generating a Multimedia Broadcast Multicast Service, MBMS, Traffic Key, MTK, at a Broadcast Multicast Service Center, BMSC, the method comprising:
   receiving a MBMS Service Key, MSK, corresponding to an MSK generated at a centralized key management service; and
   generating the MTK for use in encrypting content transmitted towards a user equipment node, UE, in accordance with the received MSK.

2. The method of claim 1 wherein the step of receiving includes receiving the MSK from the centralized key management service over a network interface.

3. The method of claim 1 wherein the step of receiving includes receiving, over a network interface, the MSK from a standalone server transmitting the MSK on behalf of the centralized key management service.

4. The method of claim 1 wherein the MTK is generated as a function of the received MSK and a MTK seed value.

5. The method of claim 4 wherein the function is a standardized key generation function.

6. The method of claim 5 wherein the standardized key generation function is a key generation function defined in the Third Generation Partnership Project Technical Specification 33.220.

7. The method of claim 4 wherein the MTK is also generated as a function of at least one parameter selected from a list including a service ID, a Key Domain ID, a MSK ID associated with the received MSK, an MRK and a CK∥IK.

8. The method of claim 7 wherein the at least one parameters is transformed before being input to the KDF.

9. The method of claim 7 wherein the MTK ID is a sequence number.

10. The method of claim 4 wherein the MTK seed value is generated as a function of an MTK generation key, and an MTK ID.

11. The method of claim 10 wherein the MTK generation key is known to the BMSC but not known to the UE.

12. The method of claim 10 wherein the MTK generation key is provided by the centralized key management service.

13. The method of claim 12 wherein the MTK generation key is provided by the centralized key management service as a static value.

14. The method of claim 12 wherein the MTK generation key is provided by the centralized key management service on a periodic basis.

15. A method, for execution at a centralized key management server, of distributing keys for securing content, the method comprising:
    generating a MBMS Service Key, MSK;
    transmitting the generated MSK to a Broadcast Multicast Service Center, BMSC, without transmitting a corresponding Multimedia Broadcast Multicast Traffic Key, MTK, the MSK for use in generating a MTK for encrypting content for transmission to a user equipment node, UE; and transmitting, towards the UE, a decryption key for the UE to decrypt the content stream transmitted by the BMSC and encrypted by the BMSC using the MTK generated at the BMSC in accordance with the transmitted MSK.

16. The method of claim 15 wherein the decryption key is the MTK not transmitted to the BMSC.

17. The method of claim 15 wherein the step of transmitting the generated MSK includes transmitting the generated MSK to a standalone server for distribution to the BMSC.

18. The method of claim 15 further including the step of transmitting a key generation function towards the BMSC, the key generation function for use by the BMSC in generating an MTK in accordance with the MSK, the generated MTK and MSK for use in encrypting the content stream.

19. The method of claim 15 further including the step of transmitting at least one of service ID, a Key Domain ID, a MSK ID associated with the received MSK, an MRK and a CK∥IK to the BMSC.

20. A Broadcast Multicast Service Center node comprising:
   a network interface for communicating with a user equipment node and a centralized key management server;
   a memory for storing instructions; and
   a processor for executing the stored instructions, that upon executing the stored instructions causes the Broadcast Multicast Service Center node to:
      generate a Multimedia Broadcast Multicast Service, MBMS, Traffic Key, MTK, for use in encrypting content transmitted towards the user equipment node in accordance with a MBMS Service Key, MSK, that corresponds to an MSK generated at the centralized key management server.

21. A centralized key management server comprising:
a network interface for communicating with a user equipment node and a Broadcast Multicast Service Center node;
a memory for storing instructions; and
a processor for executing the stored instructions, that upon executing the stored instructions causes the centralized key management server to:
   generate a Multimedia Broadcast Multicast Service, MBMS, Service Key, MSK;
   transmit the generated MSK to a Broadcast Multicast Service Center, BMSC, without transmitting a corresponding MBMS Traffic Key, MTK, the MSK for use in generating a MTK for encrypting content for transmission to a user equipment node, UE; and
   transmitting, towards the UE, a decryption key for the UE to decrypt the content stream transmitted by the BMSC and encrypted by the BMSC using the MTK generated at the BMSC in accordance with the transmitted MSK.

\* \* \* \* \*